United States Patent [19]
De Raad et al.

[11] Patent Number: 6,086,236
[45] Date of Patent: Jul. 11, 2000

[54] SYSTEM AND METHOD FOR AUTOMATICALLY CALIBRATING CONTROL DEVICES FOR COMPUTER APPLICATIONS

[75] Inventors: Geurt B. De Raad, Union City; Andrei E. Pchenitchnikov, Sunnyvale, both of Calif.

[73] Assignee: Logitech, Inc., Fremont, Calif.

[21] Appl. No.: 08/985,393

[22] Filed: Dec. 4, 1997

[51] Int. Cl.[7] .................................................. G05B 13/02
[52] U.S. Cl. ................................ 364/148.01; 364/528.1
[58] Field of Search ........................... 364/148.01, 528.1; 396/508, 463; 702/105

[56] References Cited

U.S. PATENT DOCUMENTS

| | | |
|---|---|---|
| 4,710,758 | 12/1987 | Mussler et al. .................. 340/712 |
| 4,903,012 | 2/1990 | Ohuchi ............................ 340/709 |
| 5,216,622 | 6/1993 | Kibblewhite et al. ............ 364/528.1 |
| 5,325,315 | 6/1994 | Engel et al. ..................... 702/105 |
| 5,551,701 | 9/1996 | Bouton et al. ................... 463/36 |
| 5,555,060 | 9/1996 | O'Brien et al. .................. 396/508 |

*Primary Examiner*—William Grant
*Assistant Examiner*—Victoria Robinson
*Attorney, Agent, or Firm*—Fenwick & West LLP

[57] ABSTRACT

A control device provides software applications with a set of calibrated axis values that are indicative of a minimum, a center, and a maximum value on an axis. These values are continuously tracked and corrected while the control device is in use. As the user manipulates the control device, input axis values are monitored for calibration drift. When such calibration drift is detected, the minimum and the maximum axis values are automatically adjusted, while the center axis value is adjusted only when such center axis value remains substantially constant for a given time. If the operating system of the computer has default axis values for an uncalibrated axis, the adjusted axis values are scaled accordingly so as not to interfere with such default axis values.

56 Claims, 7 Drawing Sheets

| Device # | Type | $Min_{theoretical}$ | $Max_{theoretical}$ | $Min_{actual}$ | $Max_{actual}$ |
|---|---|---|---|---|---|
| 1 | A | 0 | 255 | 10 | 241 |
| 2 | A | 0 | 255 | 15 | 237 |
| 3 | B | 0 | 128 | 5 | 120 |
| 4 | B | 0 | 128 | 8 | 119 |

SYSTEM AND METHOD FOR AUTOMATICALLY CALIBRATING CONTROL DEVICES FOR COMPUTER APPLICATIONS

BACKGROUND OF THE INVENTION

1. Field of the Invention

This invention relates to control devices for computer applications, and more particularly, to the auto-calibration of such devices.

2. Description of the Related Art

The advent of improved computer games has spawned a revolution in the computer gaming industry. Many new games are developed each year that take advantage of the latest technology advancements. These new games typically allow the user to control the position of an object (e.g., aircraft, gun, robot) in a three-dimensional space which is presented as a video image on a visual display. In some games, the user may also control the angular orientation of the object in the three-dimensional space.

To fully enjoy these new games, sophisticated control devices with six-degrees-of-freedom (e.g., three for linear displacement, three for rotations) were developed. These control devices assist the user in performing 360° combination maneuvers, such as flips and spins, without the user touching the keyboard or game controller buttons, or spinning a "spinner" knob. One example of an advanced control device is the CYBERMAN 2, developed by Logitech Inc. of Fremont, Calif. This control device has a spring type mechanical attachment to a base that, when combined with digital technology, allows a user to move realistically in all directions in gaming and virtual reality environments.

One problem with conventional control devices, particularly joysticks, is their need to be calibrated. Control devices must be calibrated because the actual limits on the axis ranges of each control device can vary from their theoretical values, even along the same control device product line. Moreover, control devices typically need to be re-calibrated after or during each use to account for calibration drift caused by users who place vigorous physical demands on their control devices.

For example, in a two-dimensional application environment, a properly calibrated control device in its mechanically "neutral" position (i.e., non-deflected) ideally should report center axis values of (0,0). Having properly calibrated center axis values is important when object position reports are relative to the center axis. Similarly, the minimum and maximum axis values ideally should report values that reflect a one-to-one correspondence between the mechanical boundaries of the control device and the visual boundaries of the application environment.

For an uncalibrated control device, however, the center coordinate values are not correctly reported, and problems such as "ghosting" can occur (i.e., the application object moves in the application environment on a computer screen even when the user has not initiated any input).

To combat the calibration problem, some conventional control devices include mechanical wheels attached to potentiometers to adjust the electrical signals generated in response to mechanical movements or to adjust spring tensions in spring-loaded systems. These mechanically calibrated control devices are not always effective in complex spring-loaded systems because such systems have too many springs. Moreover, the additional hardware components makes these devices too expensive to manufacture.

Alternatively, some conventional control devices rely on calibration software to calibrate the output of the control device. Such software typically requires the user to move the cursor within a calibration grid on the computer screen and to focus on particular calibration points. These calibration points are usually placed along the perimeter and at the center of the grid. The manual calibration software is undesirable because it allows human error to enter the calibration process, thereby diminishing the performance of the control device.

Accordingly, there is a need for a system that automatically calibrates control devices for computer applications. Such a system should continually adapt to input axis values from the control device while the device is being used. Such a system should also be compatible with a variety of control devices, applications, and operating systems.

SUMMARY OF THE INVENTION

The present invention provides software applications with a set of calibrated axis values that are indicative of a minimum, a center, and a maximum value on an axis. These values are continuously tracked and corrected while the control device is in use. As the user manipulates the control device, input axis values generated by the control device are monitored for calibration drift. When calibration drift is detected, the minimum and maximum axis values are automatically adjusted, while the center axis value is adjusted only when such center axis value remains substantially constant for a given time. If the operating system of the computer has default axis values for an uncalibrated axis, the adjusted axis values are scaled accordingly so as not to interfere with such default axis values.

One embodiment of an auto-calibration system that automatically calibrates the output of a control device comprises a first, a second, and a third module each having an input and an output. The input of each module is coupled to receive an input axis value from the control device. The first and the second module produce a minimum and a maximum axis value, respectively. The third module produces a center axis value only if the input axis value remains substantially constant for a predetermined interval of time.

The auto-calibration system further includes a fourth module having at least two inputs and an output. The first input is coupled to receive the input axis value from the control device. The second input is coupled to the outputs of the first, the second, and the third modules for receiving the minimum, the maximum, and the center axis values, respectively. The fourth module processes the input axis value from the control device, along with the minimum, the maximum, and the center axis values to produce, at the output of the fourth module, a calibrated axis value. In another embodiment of the present invention, this calibrated axis value is scaled to be in a default axis value range.

The present invention automatically calibrates the output of a control device for computer applications by receiving an input axis value from the control device, generating a minimum axis value and a maximum axis value from the input axis value and predetermined axis values, generating a center axis value from the input axis value and the predetermined axis values if the input axis value remains substantially constant for a predetermined interval of time, and processing the input axis value and the minimum, the maximum, and the center axis values to produce a calibrated axis value. In another embodiment, the present invention scales the calibrated axis value to a value that is in a default axis value range.

These and other features, aspects, and advantages of the present invention will become better understood with regard to the following description, appended claims, and accompanying drawings.

DETAILED DESCRIPTION OF THE INVENTION

Figure 1A:
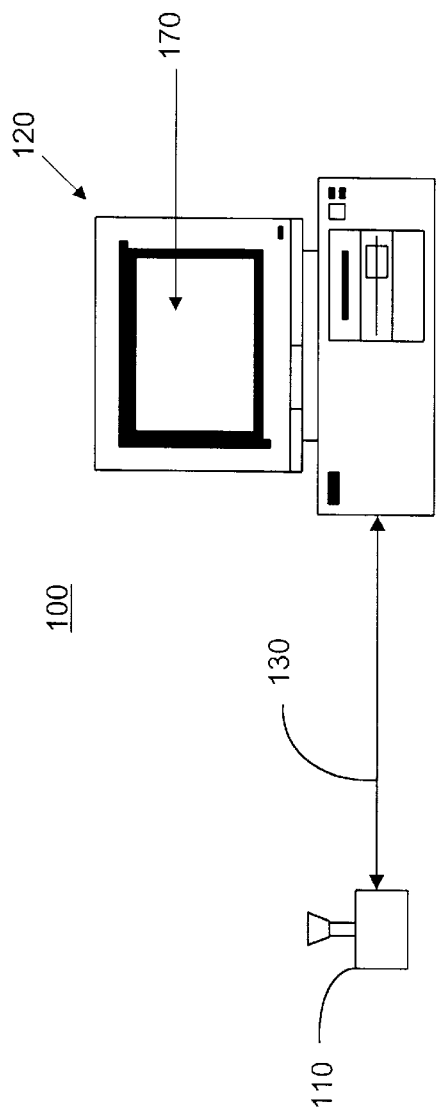
FIG. 1A is a diagram of one embodiment of a gaming system in accordance with the present invention.

Referring to FIG. 1A, there is an illustration of a gaming system 100. The gaming system 100 includes a control device 110 and a computer system 120 that includes a visual display 170. The control device 110 is coupled to the computer system 120 by a communication link 130. The communication link 130 is, for example, a bi-directional serial data bus. The control device 110 is, for example, a joystick.

The control device 110 is used to indicate the position of a cursor on the visual display 170. The term "cursor," as used herein, may be any object on a visual display 170 that is controlled by the user via the control device 110. A conventional joystick has a rod that protrudes vertically from a base. Inside the base are a set of potentiometers that can sense when the rod is deflected from the vertical or "neutral" position. The potentiometers produce electrical signals that represent the current position of the rod.

Control devices 110 usually indicate only two-dimensional positions by moving the rod laterally, but there are also three-dimensional control devices 110 in which the third dimension is indicated by rotation of the rod or by spinning a knob or moving a slider that is located on the base. Similar to a pointing device, a control device 110, such as a joystick, is good for gross movement, but not necessarily for precision work.

Digital control devices provide players with improved gaming performance by providing greater precision and accuracy than their analog counterparts. This is accomplished by converting the electrical signals generated by the potentiometers to integer values (i.e., quantization) before transmitting them to the computer system 120 via the communication link 130. The computer system 120 receives these integer values and provides a corresponding position of the cursor on the visual display 170.

Figure 1B:
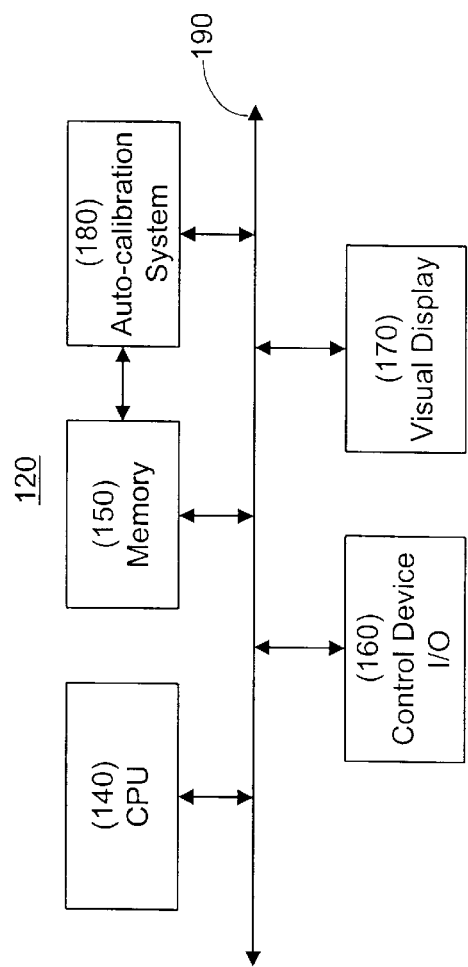
FIG. 1B is a block diagram of one embodiment of a computer system in accordance with the present invention.

While the description that follows refers to digital control devices, the present invention is equally valid for analog control devices that provide signals that are processed by a control device I/O, for example, a control device I/O 160 illustrated in FIG. 1B, before being used by the application.

The computer system 120 provides the platform for a game environment. The computer system 120 preferably is a personal computer (PC), but other computer systems, including computer networks and the Internet, can provide a suitable platform for the game environment.

Referring to FIG. 1B, there is shown a block diagram of one embodiment of the computer system 120. While the elements shown in FIG. 1B were selected to better illustrate the present invention, other elements may also be included with the computer system 120 (e.g., keyboard, power supply, graphics accelerators). The computer system 120 preferably includes a central processing unit (CPU) 140, a memory 150, a control device I/O 160, a visual display 170, an auto-calibration system 180, and a data bus 190.

The CPU 140 is coupled to the data bus 190. The data bus 190 is, for example, an Industry Standard Architecture (ISA) bus used in conventional PCs. The CPU 140 executes the application software and manages the computing environment including software drivers and an operating system. The operating system, such as Windows™ 95 developed by Microsoft® Corporation of Redmond, Wash., provides system services to the auto-calibration system 180 and the control device 110.

The memory 150 is coupled to the data bus 190 and the auto-calibration system 180. The memory 150 is conventional computer memory and implemented with conventional memory devices, for example, random access memory (RAM) or dynamic random access memory (DRAM). The memory 150 caches initialization parameters for the auto-calibration system 180.

The control device I/O 160 is coupled to the data bus 190 and provides a conventional interface (e.g., 15-pin game port) between the control device 110 and the computer system 120.

The auto-calibration system 180 is coupled to the data bus 190 and the memory 150. It automatically calibrates the control device 110 for use by the application software.

Figure 2:
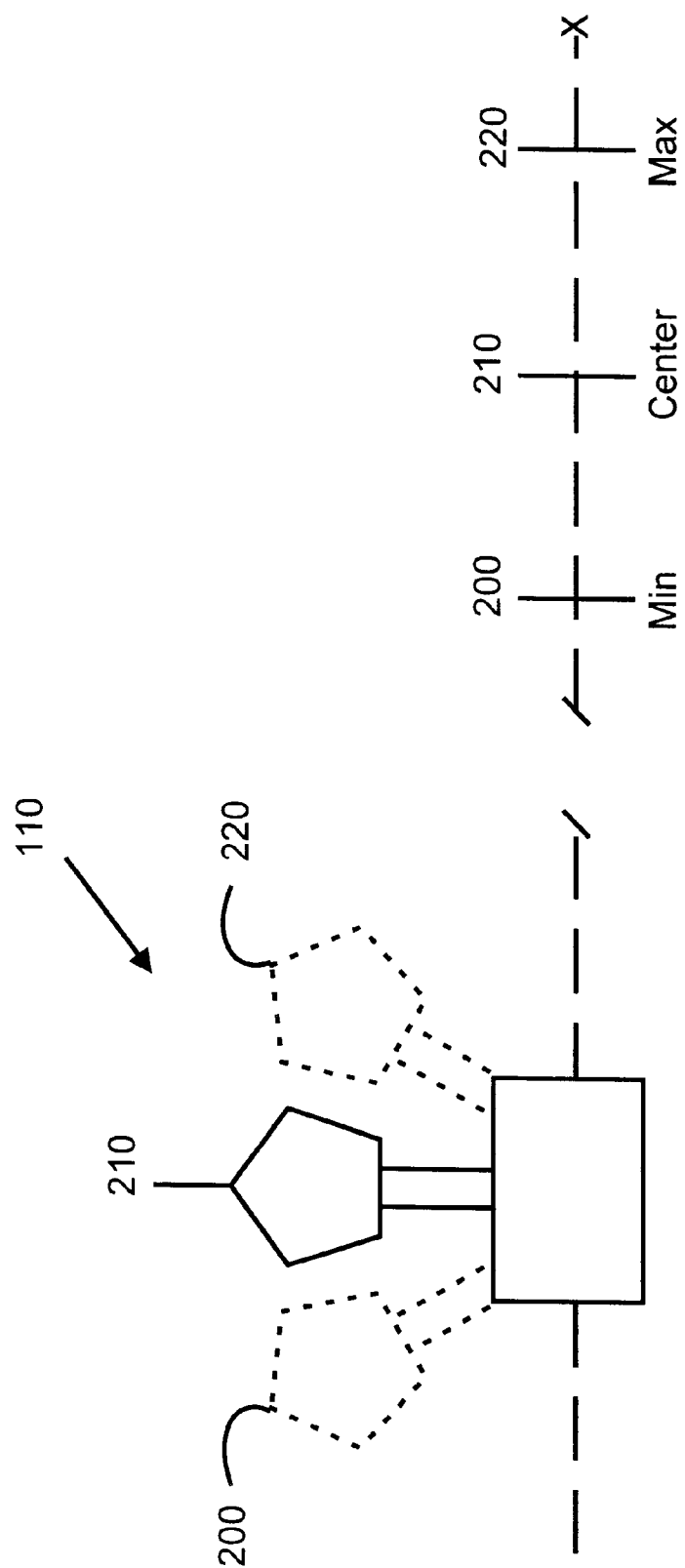
FIG. 2 is an illustration showing the relationship between axis boundaries and joystick deflection in accordance with the present invention.

Referring to FIG. 2, there is an illustration of the relationship between axis boundaries and joystick deflection. While for simplicity only the X-axis in a two-dimensional space is illustrated in FIG. 2, the description that follows is applicable to any axis (e.g., X-axis, Y-axis, or Z-axis) in a three-dimensional space controlled by the control device 110.

The mechanical limits of the control device 110 can be characterized along the X-axis by three positions. For example, a first position 200 corresponds to a minimum boundary on the X-axis. In other words, when the control device 110 is fully deflected to the first position 200, the corresponding cursor is at the boundary of the useable application environment as defined by the application software (e.g., the far left edge of the visual display 170). Similarly, a second position 220 corresponds to a maximum boundary on the X-axis. When the control device 110 is fully deflected to the second position 220, the corresponding cursor is at the opposite boundary of the useable application environment as defined by the application software (e.g., the far right edge of the visual display 170). When the control device is in a center or neutral position 210, the corresponding cursor is at the center of the useable game space as defined by the application software (e.g., the center of the visual display 170).

Figure 3:
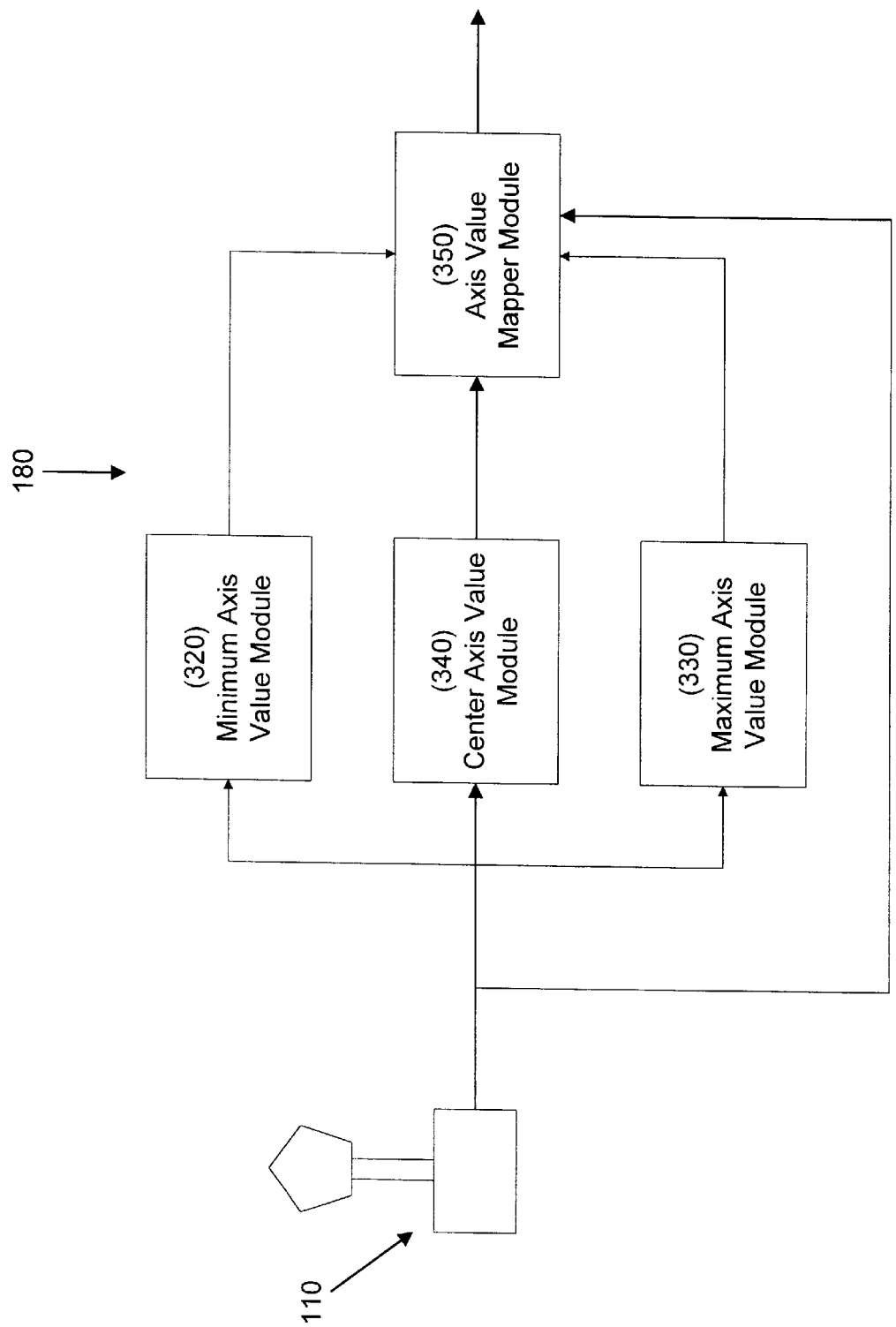
FIG. 3 is a block diagram of one embodiment of an auto-calibration system in accordance with the present invention.

Referring to FIG. 3, there is shown a block diagram of one embodiment of the auto-calibration system 180. The auto-calibration system 180 includes a minimum axis value module 320, a maximum axis value module 330, a center axis value module 340, and an axis value mapper module 350. The axis value modules 320 and 330 perform similar functions and will therefore be described together.

The axis value modules 320 and 330 each have an input and an output. The inputs are coupled to the control device 110 for receiving the input axis value. While the user manipulates the control device 110, the axis value modules 320 and 330 track the minimum and maximum axis values for each axis. Several times over a predetermined time interval, for example, each second, the axis value modules 320 and 330 compute the minimum and maximum axis values, respectively, and store these values in memory 150 (hereinafter referred to as $Min_{stored}$ and $Max_{stored}$, respectively). These values are also passed to the axis value mapper module 350 where they are linear scaled to a default range of axis values provided by an operating system (e.g., Windows 95) for uncalibrated axes.

Generally, the calibration process is done at the beginning of each computer game or at the time the control device 110 is installed in the computer system 120. In the latter case, the control device 110 calibration parameters are stored in the memory 150 of the computer system 120 where they are retrieved by the applications via operating system services. If calibration is required before executing the application, the auto-calibration system 180 will not disturb the calibration of such application. Moreover, the auto-calibration system 180 is compatible with operating systems that provide default characteristics for uncalibrated axes, such as Windows 95. The axis value mapper module 350 provides this compatibility by linear fitting the calibrated axis value to the operating system default characteristics for uncalibrated axes.

It is preferred, that the auto-calibration system 180 receive and store a theoretical minimum axis value, a center axis value, and a maximum axis value. These axis values, as well as all axis values, preferably are integers from the set of integers {0, 255} for an eight-bit digital control device 110. The theoretical axis values can be stored in cache memory 150 and accessed during the boot-up of the computer system 120.

The auto-calibration system 180 uses input axis value estimates, based on these theoretical axis values, to provide the auto-calibration system 180 with a correct initial response to user inputs. Thereafter, the auto-calibration system 180 will continually adjust the minimum, center, and maximum axis values while the control device 110 is being used.

Figures 4A, 4B:
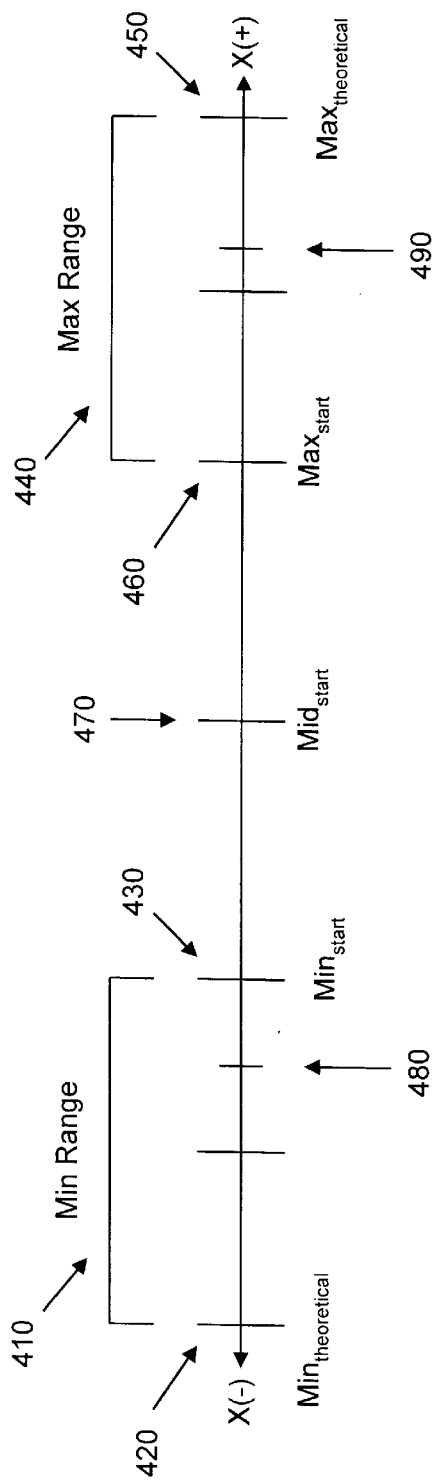
FIG. 4A is a conceptual illustration of the operations performed by one embodiment of a minimum axis value module and a maximum axis value module in accordance with the present invention.
FIG. 4B is a table of integer values illustrating theoretical versus actual axis boundaries in accordance with the present invention.

Referring to FIG. 4A, there is a conceptual illustration of the functions performed by the axis value modules 320 and 330. While for simplicity only the X-axis in a two-dimensional space is illustrated in FIG. 4A, the description that follows is applicable to any axis (e.g., X-axis, Y-axis, or Z-axis) in a three-dimensional space controlled by the control device 110.

A $Min_{theoretical}$ value 420 and a $Min_{start}$ value 430 are the boundaries of a minimum range 410 on the X-axis. Similarly, a $Max_{theoretical}$ value 450 and a $Max_{start}$ value 460 are the boundaries of a maximum range 440 on the X-axis. The $Min_{theoretical}$ value 420 and the $Max_{theoretical}$ value 450 are the smallest and largest integer values, respectively, that are theoretically possible for a given resolution. For example, the $Min_{theoretical}$ value 420 is the integer 0 and the $Max_{theoretical}$ value 450 is the integer 255 for an eight-bit control device 110 which has a theoretical axis resolution of 256 integer values (i.e., $2^8$=256). In other words, a position report produced by the control device 110 for an axis is one of 256 possible integer values.

The theoretical center of the X-axis is indicated by a $Mid_{start}$ value 470. This value is computed from the $Min_{theoretical}$ value 420 and the $Max_{theoretical}$ value 450. While the user manipulates the control device 110, the axis value modules 320 and 330 monitor the minimum range 410 and the maximum range 440, respectively. If the axis value module 320 detects an input axis value 480 within the minimum range 410, the input axis value 480 is set equal to the minimum axis value and stored in memory 150 (hereinafter also referred to as $Min_{stored}$ value 480). The $Min_{stored}$ value 480 is the current value of the minimum axis value and is used by the axis value mapper module 350 to compute the calibrated axis value. Similarly, if the axis value module 330 detects a input axis value 490 within the maximum range 440, the input axis value 490 is set equal to the maximum axis value and stored in the memory 150 (hereinafter also referred to as $Max_{stored}$ value 490). The $Max_{stored}$ value 490 is the current value of the maximum axis value and is used by the axis value mapper module 350 to compute the calibrated axis value.

The starting integer values for the $Min_{start}$, $Max_{start}$, and $Mid_{start}$ values are based on the following formulas:

$$Mid_{start} = \frac{Max_{theoretical} + Min_{theoretical}}{2},$$

$$Min_{start} = (1 - T)Mid_{start},$$

$$Max_{start} = (1 + T)Mid_{start},$$

where a tolerance, T, is a percentage of the $Mid_{start}$ value.

The tolerance, T, in the above formulas preferably is in the range of about 0.25 to about 0.5. Accordingly, if T is 0.25, then $Min_{start}$ is 75% the value of $Mid_{start}$ and $Max_{start}$ is 125% the value of $Mid_{start}$. The exact value of T typically depends on the quality of the control device 110 manufacturing. For an eight-bit control device, the above equations are theoretically confined to operate on the set of integer values {0, 255}.

Referring to FIG. 4B, there is a table of integer values illustrating how theoretical and actual values differ over two types of control devices.

Device number one is an eight-bit control device having a theoretical minimum (i.e., $Min_{theoretical}$ value 420) equal to the integer value 0, and a maximum axis value (i.e., $Max_{theoretical}$ value 450) equal to the integer value of 255. The actual values for these theoretical axis values are 10 and 241, respectively. Similarly, device number two has theoretical minimum and maximum axis values of 0 and 255, respectively. The actual minimum and maximum axis values are 15 and 241, respectively. Thus, even between control devices of the same type (i.e. type "A"), there is a difference between the theoretical and actual minimum and maximum axis values. The present invention advantageously accounts for these differences when automatically calibrating a control device.

Figure 5:
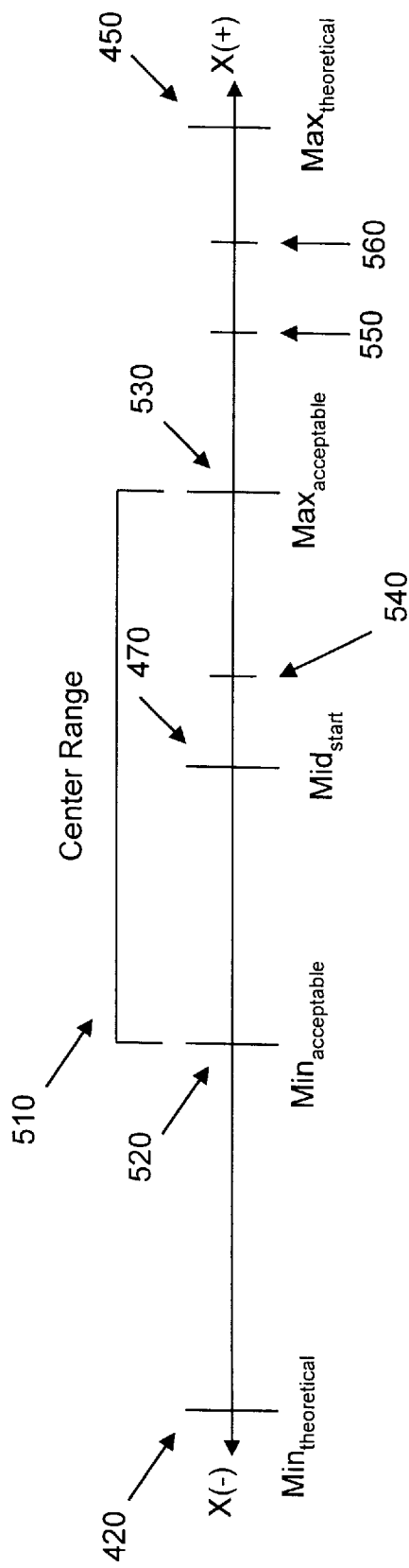
FIG. 5 is a conceptual illustration of the operation of one embodiment of a center axis value module in accordance with the present invention.

Referring to FIG. 5, there is a conceptual illustration of the functions performed by the center axis value module 340. While for simplicity only the X-axis in a two-dimensional space is illustrated in FIG. 5, the description that follows is applicable to any axis (e.g., X-axis, Y-axis, or Z-axis) in a three-dimensional space controlled by the control device 110.

The center axis value module 340 generates a center axis value 540 equal to the input axis value, if such input axis value is in a center range 510, and providing that such input axis value remains substantially constant for a given interval of time. It is indeed very difficult for a user to maintain the exact same non-center position without moving. Assuming an average user, the elapsed time required for the input axis value to remain substantially constant typically is about 15 seconds.

A $Min_{acceptable}$ value 520 and a $Max_{acceptable}$ value 530 are the boundaries on a center range 510 located on the X-axis. The $Min_{theoretical}$ value 420 and the $Max_{theoretical}$ value 450 are used to compute the $Mid_{start}$ value 470. While the user manipulates the control device 110 during a game, the center axis value module 340 monitors the center range 510. If the center axis value module 340 detects an input axis value 540 within the center range 510, and this value remains substantially constant for a predetermined interval, then the input axis value 540 is stored in memory 150 (hereinafter also referred to as $Mid_{stored}$ value 540) along with the time at which it was obtained. The $Mid_{stored}$ value 540 is used by the axis value mapper module 350 to compute the calibrated axis value.

The boundaries, $Min_{acceptable}$ and $Max_{acceptable}$, of the center range 510 are given by the following formulas:

$$Mid_{start} = \frac{Max_{theoretical} + Min_{theoretical}}{2},$$

$$Min_{acceptable} = (1 - T)Mid_{start},$$

$$Max_{acceptable} = (1 + T)Mid_{start},$$

where a tolerance, T, is a percentage of the $Mid_{start}$ value.

The tolerance, T, in the above equations preferably is in the range of about 0.1 to about 0.25. Accordingly, if T is 0.1, then $Min_{acceptable}$ is 90% the value of $Mid_{start}$ and $Max_{acceptable}$ is 110% the value of $Mid_{start}$. The exact value of T typically depends on the quality of the control device 110 manufacturing. For an eight-bit control device, the above equations are theoretically confined to operate on the set of integer values {0, 255}. A starting value for the center is the first input axis value read from the control device 110.

The center axis value module 340 also keeps track of a current axis value, $Axis_{current}$ 550, and an old axis value, $Axis_{old}$ 560. These values are input axis value at times $t_1$ and $t_2$, respectively, where $t_2 > t_1$. To compensate for vibration coming from the environment, the $Axis_{current}$ value 550 must be considered substantially constant. The $Axis_{current}$ value 550 is substantially constant if the following condition is met:

$$|Axis_{current} - Axis_{old}| \leq V,$$

where V is a vibration threshold.

The threshold V preferably is the integer 1, but the exact value depends on the resolution of the axis and the playing environment. The above equation defines a "dead-band" for preventing erroneous and/or unnecessary calculations of the $Mid_{stored}$ value 540.

Figure 6:
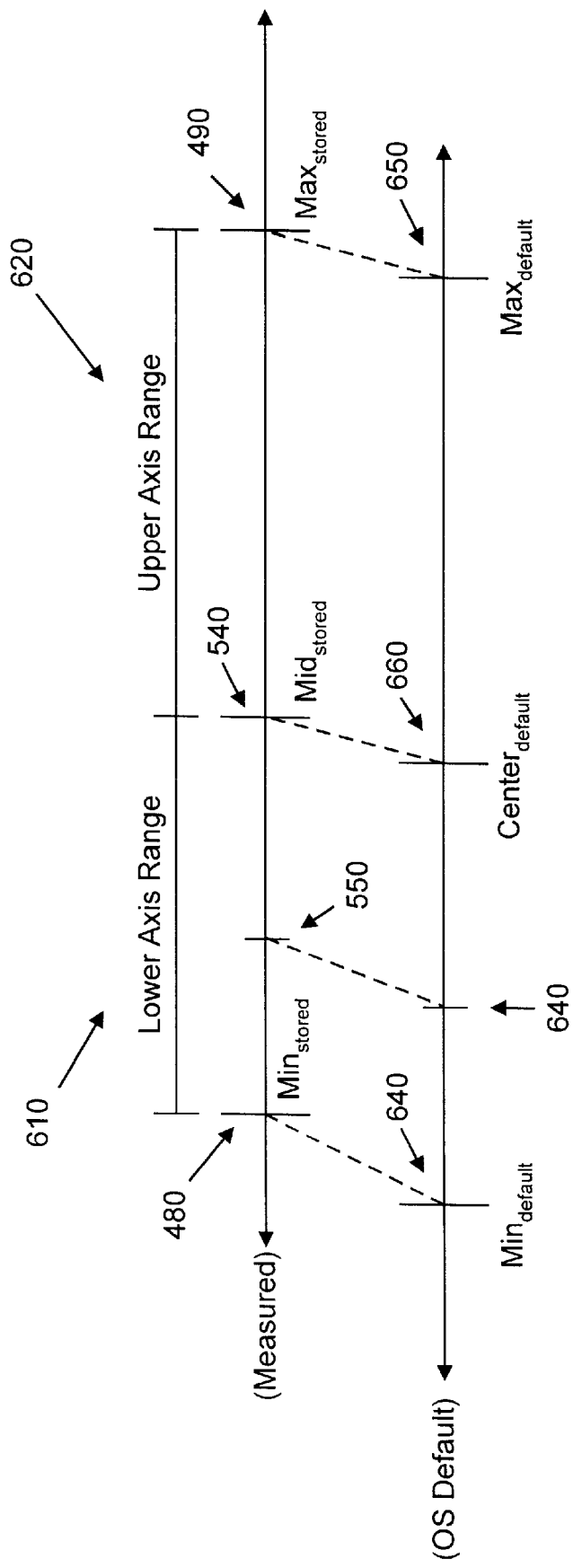
FIG. 6 is a conceptual illustration of the operation of one embodiment of an axis value mapper in accordance with the present invention.

Referring to FIG. 6, there is a conceptual illustration of the functions performed by the axis value mapper module 350. While for simplicity only the X-axis in a two-dimensional space is illustrated in FIG. 6, the description that follows is applicable to any axis (e.g., X-axis, Y-axis, or Z-axis) in a three-dimensional space controlled by the control device 110.

Given the minimum, the center, and the maximum values of an axis, the axis value mapper module 350 scales the $Axis_{current}$ value 550 to a calibrated axis value, $Axis_{calibrated}$ 640, within an uncalibrated default range, typically defined by the operating system. The uncalibrated range varies from a minimum default value, $Min_{default}$ 640, to a maximum default value, $Max_{default}$ 650, with a center default value, $Center_{default}$ 660, defined by the following equation:

$$Mid_{default} = \frac{Max_{default} - Min_{default}}{2}$$

The axis value mapper module 350 scales the $Axis_{current}$ value 550 to the $Axis_{calibrated}$ value 640 using a set of linear fittings. To apply these fittings, each axis is conceptually divided into a lower range 610 and an upper range 620. A different fitting is then applied to each range as follows:

If $Axis_{current} < Mid_{stored}$ (i.e., the lower range 610), the following linear fitting equation is used:

$$Axis_{calibrated} = (Axis_{current} - Min_{stored})\left(\frac{Mid_{default} - Min_{default}}{Mid_{stored} - Min_{stored}}\right) + Min_{default},$$

If $Axis_{current} > Mid_{stored}$ (i.e., the upper range 620), the following linear fitting equation is used:

$$Axis_{calibrated} = (Axis_{current} - Mis_{stored})\left(\frac{Max_{default} - Mid_{default}}{Max_{stored} - Mid_{stored}}\right) + Mid_{default},$$

If $Axis_{current} = Mid_{stored}$, then $Axis_{calibrated} = Mid_{default}$.

By applying the above formulas, the axis value mapper module 350 produces calibrated axis values that fit the operating system characteristics of an uncalibrated axis. If the axis values are not scaled, the operating system may replace the axis values produced by the auto-calibration system 180 with default values, thereby undoing the calibration. These default values may be provided by the operating system (e.g., Windows 95), the application, or the user.

Figure 7:
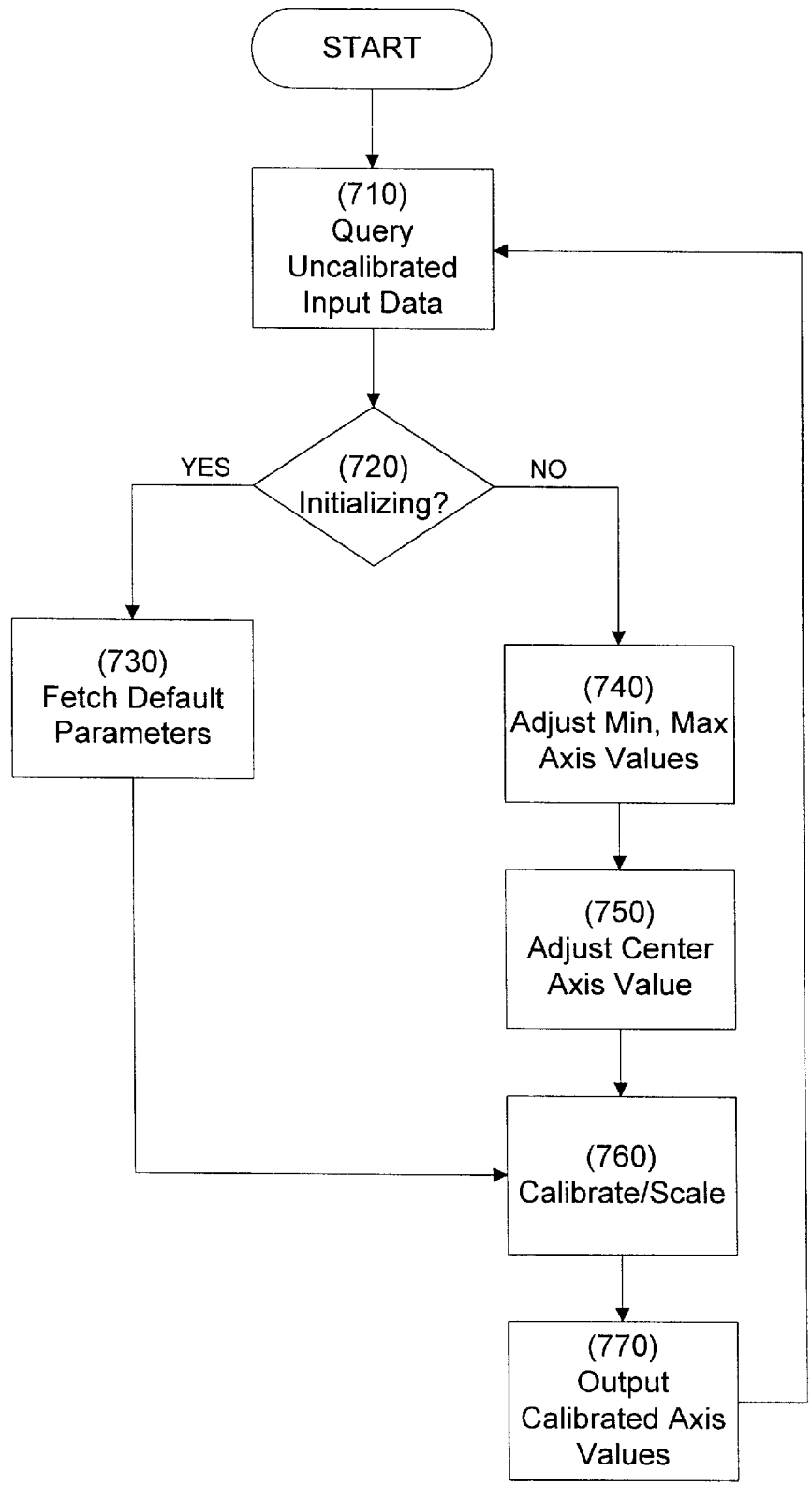
FIG. 7 is a flowchart illustrating operation of one embodiment of the auto-calibration system in accordance with the present invention.

Referring to FIG. 7, there is shown a flowchart illustrating operation of one embodiment of the auto-calibration system 180. Several times each second, the control device 110 is queried 710 for input axis values. If initializing 720 (e.g., boot-up), default parameters are fetched 730 from the memory 150 instead, and used as starting values by the auto-calibration system 180. After initializing 720, the input axis values are processed by the auto-calibration system 180 several times per second. For each process cycle, the $Min_{stored}$ value 480 and the $Max_{stored}$ value 490 are adjusted 740, if necessary, by the axis value modules 320 and 330, respectively. In contrast, the $Mid_{stored}$ value 540 is adjusted 750 by the axis value module 340 only if it is determined that $Axis_{current}$ 550 is substantially constant when compared with $Axis_{old}$ 560. The adjusted $Min_{stored}$ value 480, the $Max_{stored}$ value 490, and the $Mid_{stored}$ value 540, are then calibrated and scaled 760 by the axis value mapper 350 before being output 770 to the computer system 120 for use by the application. The process just described is executed while the user manipulates the control device 110.

An advantage of the present invention is that the auto-calibration system 180 continually adapts to input axis values from the control device 110 while the device is being used. Therefore, control devices using the present invention need not be re-calibrated after or during each use to account for calibration drift caused by users who place vigorous physical demands on their control devices.

Another advantage of the present invention is its compatibility with a variety of control devices, applications, and operating systems. This compatibility includes scaling calibrated axis values so that they fall within a default axis range determined by the operating system.

Although the present invention has been described in considerable detail with reference to certain preferred embodiments thereof, other embodiments are possible. For example, the auto-calibration system 180 may be implemented in hardware as combination and/or sequential logic. Moreover the entire auto-calibration system 180 may implemented as an Integrated Circuit (IC). Therefore, the spirit and scope of the appended claims should not be limited to the description of the preferred embodiments herein.

What is claimed is:

1. A system for automatically calibrating an output of a control device for computer applications, comprising:
    a first module, including an input and an output, for producing a minimum axis value, the input coupled to receive an input axis value from the control device;
    a second module, including an input and an output, for producing a maximum axis value, the input coupled to receive the input axis value from the control device;
    a third module, including an input and an output, the input coupled to receive the input axis value from the control device, the third module for producing a center axis value in response to the input axis value remaining substantially constant for a predetermined interval of time; and
    a fourth module, including at least two inputs and an output, a first input coupled to receive the input axis value from the control device, a second input coupled to the outputs of the first, the second, and the third modules for receiving the minimum, the maximum, and the center axis values, respectively, the fourth module for processing the input axis value and the minimum, the maximum, and the center axis values to produce, at the output of the fourth module, a calibrated axis value that is scaled within a default axis value range.

2. The system of claim 1, further including:
    a processor; and
    a memory, coupled to the processor for storing the first, second, third, and fourth modules, the modules comprising a sequence of instructions, which, when executed by the processor, cause the processor to perform the steps of:
        receiving the input axis value from the control device;
        generating the minimum axis value and the maximum axis value from the input axis value and predetermined axis values;
        generating the center axis value from the input axis value and the predetermined axis values if the input axis value remains substantially constant for a predetermined interval of time; and
        processing the input axis value and the minimum, maximum, and center axis values to produce the calibrated axis value.

3. The system of claim 2, wherein the step of generating the minimum axis value further includes the steps of:
    monitoring a first range of axis values having boundaries determined by the predetermined axis values; and
    setting the minimum axis value equal to the input axis value when the input axis value is in the first range.

4. The system of claim 3, wherein a first boundary on the first range is equal to $Min_{theoretical}$ and a second boundary on the first range is equal to $Min_{start}$, wherein $$Min_{start} = (1 - T)Mid_{start} \text{ and}$$

$$Mid_{start} = \frac{Max_{theoretical} + Min_{theoretical}}{2}.$$

5. The system of claim 4, wherein T is in the range from about 0.25 to about 0.5.

6. The system of claim 2, wherein the step of generating the maximum axis value further includes the steps of:
    monitoring a second range of axis values having boundaries determined by the predetermined axis values; and
    setting the maximum axis value equal to the input axis value when the input axis value is in the second range.

7. The system of claim 6, wherein a first boundary on the second range is equal to $Max_{theoretical}$ and a second boundary on the second range is equal to $Max_{start}$, wherein $$Max_{start} = (1 + T)Mid_{start} \text{ and}$$

$$Mid_{start} = \frac{Max_{theoredtical} + Min_{theoretical}}{2}.$$

8. The system of claim 7, wherein T is in the range from about 0.25 to about 0.5.

9. The system of claim 2, wherein the step of generating the center axis value further includes the steps of:
    monitoring a third range of axis values having boundaries determined by the predetermined axis values; and
    setting the center axis value equal to the input axis value when the input axis value is in the third range.

10. The system of claim 9, wherein a first boundary for the third range is equal to $Min_{acceptable}$, wherein $Min_{acceptable} = (1-T) Mid_{start}$ and a second boundary for the third range is equal to $Max_{acceptable}$, wherein $$Max_{acceptable} = (1 + T)Mid_{start} \text{ and}$$

$$Mid_{start} = \frac{Max_{theoretical} + Min_{theoretical}}{2}.$$

11. The system of claim 9, wherein the maximum axis value is set equal to the input axis value only after the input axis value remains substantially constant for a predetermined interval of time.

12. The system of claim 10, wherein T is in the range from about 0.1 to about 0.25.

13. The system of claim 2, wherein the input axis value is substantially constant if the condition $|Axis_{current} - Axis_{old}| \leq V$ is satisfied.

14. The system of claim 13, wherein the tolerance V is equal to 1.

15. The system of claim 2, wherein the interval of time required for the input axis value to remain substantially constant is about 15 seconds.

16. The system of claim 2, wherein the step of processing the input axis value and the minimum, the maximum, and the center axis values to produce the calibrated axis value further includes the step of scaling the calibrated axis value to a value within the default axis value range.

17. The system of claim 16, wherein the calibrated axis value is scaled to fit in a first portion of the default range using the linear fitting $$Axis_{calibrated} =$$
$$(Axis_{current} - Min_{stored})\left(\frac{Mid_{default} - Min_{default}}{Mid_{stored} - Min_{stored}}\right) + Min_{default},$$

where $Axis_{current} < Mid_{stored}$ and $Mid_{default} =$ $$\frac{Max_{default} - Min_{default}}{2}.$$

18. The system of claim 16, wherein the calibrated axis value is scaled to fit in a second portion of the default range by using the linear fitting $$Axis_{calibrated} =$$
$$(Axis_{current} - Mid_{stored})\left(\frac{Max_{default} - Mid_{default}}{Max_{stored} - Mid_{stored}}\right) + Mid_{default},$$

where $Axis_{current} > Mid_{stored}$ and $Mid_{default} =$ $$\frac{Max_{default} - Min_{default}}{2}.$$

19. The system of claim 16, wherein the calibrated axis value is scaled to fit in the default range by using the linear fitting $$Axis_{calibrated} = Mid_{uncalibrated},$$

where $Axis_{current} =$ $$Mid_{stored} \text{ and } Mid_{default} = \frac{Max_{default} - Min_{default}}{2}.$$

20. A computer-readable medium having stored thereon instructions which, when executed by a processor, cause the processor to perform the steps of:

receiving an input axis value from a control device;

generating a minimum axis value and a maximum axis value from the input axis value and predetermined axis values;

generating a center axis value from the input axis value and the predetermined axis values if the input axis value remains substantially constant for a predetermined interval of time; and processing the input axis value and the minimum, maximum, and center axis values to produce a calibrated axis value.

21. The computer-readable medium of claim 20, wherein the step of generating a minimum axis value further includes the steps of:

monitoring a first range of axis values having boundaries determined by the predetermined axis values; and setting the minimum axis value equal to the input axis value when the input axis value is in the first range.

22. The computer-readable medium of claim 21, wherein a first boundary on the first range is equal to $Min_{theoretical}$ and a second boundary on the first range is equal to $Min_{start}$, wherein $$Min_{start} = (1 - T)Mid_{start} \text{ and } Mid_{start} = \frac{Max_{theoretical} + Min_{theoretical}}{2}.$$

23. The computer-readable medium of claim 22, wherein T is in the range from about 0.25 to about 0.5.

24. The computer-readable medium of claim 20, wherein the step of generating a maximum axis value further includes the steps of:

monitoring a second range of axis values having boundaries determined by the predetermined axis values; and setting the maximum axis value equal to the input axis value when the input axis value is in the second range.

25. The computer-readable medium of claim 24, wherein a first boundary on the second range is equal to $Max_{theoretical}$ and a second boundary on the second range is equal to $Max_{start}$, wherein $$Max_{start} = (1 + T)Mid_{start} \text{ and } Mid_{start} = \frac{Max_{theoretical} + Min_{theoretical}}{2}.$$

26. The computer-readable medium of claim 25, wherein T is in the range from about 0.25 to about 0.5.

27. The computer-readable medium of claim 20, wherein the step of generating a center axis value further includes the steps of:

monitoring a third range of axis values having boundaries determined by the predetermined axis values; and setting the center axis value equal to the input axis value when the input axis value is in the third range.

28. The computer-readable medium of claim 27, wherein a first boundary for the third range is equal to $Min_{acceptable}$, wherein $Min_{acceptable} = (1-T)Mid_{start}$ and a second boundary for the third range is equal to $Max_{acceptable}$, wherein $$Max_{acceptable} = (1 + T)Mid_{start} \text{ and}$$

$$Mid_{start} = \frac{Max_{theoretical} + Min_{theoretical}}{2}.$$

29. The computer-readable medium of claim 27, wherein the maximum axis value is set equal to the input axis value only after the input axis value remains substantially constant for a predetermined interval of time.

30. The computer-readable medium of claim 28, wherein T is in the range from about 0.1 to about 0.25.

31. The computer-readable medium of claim 20, wherein the input axis value is substantially constant if the condition $|Axis_{current} - Axis_{old}| \leq V$ is satisfied.

32. The computer-readable medium of claim 31, wherein the tolerance V is equal to 1.

33. The computer-readable medium of claim 20, wherein the interval of time required for the input axis value to remain substantially constant is about 15 seconds.

34. The computer-readable medium of claim 20, wherein the step of processing the input axis value and the minimum, the maximum, and the center axis values to produce a calibrated axis value further includes the step of scaling the calibrated axis value to a value within a default range.

35. The computer-readable medium of claim 34, wherein the calibrated axis value is scaled to fit in a first portion of the default range using the linear fitting $$Axis_{calibrated} = (Axis_{current} - Min_{stored})\left(\frac{Mid_{default} - Min_{default}}{Mid_{stored} - Min_{stored}}\right) + Min_{default},$$

where $Axis_{current} < Mid_{stored}$ and $Mid_{default} = \frac{Max_{default} - Min_{default}}{2}$.

36. The computer-readable medium of claim 34, wherein the calibrated axis value is scaled to fit in a second portion of the default range by using the linear fitting $$Axis_{calibrated} = (Axis_{current} - Mid_{stored})\left(\frac{Max_{default} - Mid_{default}}{Max_{stored} - Mid_{stored}}\right) + Mid_{default},$$

where $Axis_{current} > Mid_{stored}$ and $Mid_{default} = \frac{Max_{default} - Min_{default}}{2}$.

37. The computer-readable medium of claim 34, wherein the calibrated axis value is scaled to fit in the default range by using the linear fitting $$Axis_{calibrated} = Mid_{uncalibrated},$$

where $Axis_{current} = Mid_{stored}$ and $Mid_{default} = \frac{Max_{default} - Min_{default}}{2}$.

38. A method of automatically calibrating the output of a control device for computer applications, comprising the steps of:
  receiving an input axis value from the control device;
  generating a minimum axis value and a maximum axis value from the input axis value and predetermined axis values;
  generating a center axis value from the input axis value and the predetermined axis values if the input axis value remains substantially constant for a predetermined interval of time; and
  processing the input axis value and the minimum, maximum, and center axis values to produce a calibrated axis value.

39. The method of claim 38, wherein the step of generating a minimum axis value further includes the steps of:
  monitoring a first range of axis values having boundaries determined by the predetermined axis values; and
  setting the minimum axis value equal to the input axis value when the input axis value is in the first range.

40. The method of claim 39, wherein a first boundary on the first range is equal to $Min_{theoretical}$ and a second boundary on the first range is equal to $Min_{start}$, wherein $$Min_{start} = (1 - T)Mid_{start} \text{ and}$$

$$Mid_{start} = \frac{Max_{theoretical} + Min_{theoretical}}{2}.$$

41. The method of claim 40, wherein T is in the range from about 0.25 to about 0.5.

42. The method of claim 38, wherein the step of generating a maximum axis value further includes the steps of:
  monitoring a second range of axis values having boundaries determined by the predetermined axis values; and
  setting the maximum axis value equal to the input axis value when the input axis value is in the second range.

43. The method of claim 42, wherein a first boundary on the second range is equal to $Max_{theoretical}$ and a second boundary on the second range is equal to $Max_{start}$, wherein $$Max_{start} = (1 + T)Mid_{start} \text{ and}$$

$$Mid_{start} = \frac{Max_{theoretical} + Min_{theoretical}}{2}.$$

44. The method of claim 43, wherein T is in the range from about 0.25 to about 0.5.

45. The method of claim 38, wherein the step of generating a center axis value further includes the steps of:
  monitoring a third range of axis values having boundaries determined by the predetermined axis values; and
  setting the center axis value equal to the input axis value when the input axis value is in the third range.

46. The method of claim 45, wherein a first boundary for the third range is equal to $Min_{acceptable}$, wherein $Min_{acceptable} = (1-T)Mid_{start}$ and a second boundary for the third range is equal to $Max_{acceptable}$, wherein $$Max_{acceptable} = (1 + T)Mid_{start} \text{ and}$$

$$Mid_{start} = \frac{Max_{theoretical} + Min_{theoretical}}{2}.$$

47. The method of claim 45, wherein the maximum axis value is set equal to the input axis value only after the input axis value remains substantially constant for a predetermined interval of time.

48. The method of claim 46, wherein T is in the range from about 0.1 to about 0.25.

49. The method of claim 38, wherein the input axis value is substantially constant if the condition $|Axis_{current} - A_{old}| \leq V$ is satisfied.

50. The method of claim 49, wherein the tolerance V is equal to 1.

51. The method of claim 38, wherein the interval of time required for the input axis value to remain substantially constant is about 15 seconds.

52. The method of claim 38, wherein the step of processing the input axis value and the minimum, the maximum, and the center axis values to produce a calibrated axis value further includes the step of scaling the calibrated axis value to a value within a default range.

53. The method of claim 52, wherein the calibrated axis value is scaled to fit in a first portion of the default range using the linear fitting $$Axis_{calibrated} = (Axis_{current} - Min_{stored})\left(\frac{Mid_{default} - Min_{default}}{Mid_{stored} - Min_{stored}}\right) + Min_{default},$$

where $Axis_{current} < Mid_{stored}$ and $Mid_{default} = \frac{Max_{default} - Min_{default}}{2}$.

54. The method of claim 52, wherein the calibrated axis value is scaled to fit in a second portion of the default range by using the linear fitting $$Axis_{calibrated} =$$

-continued $$(Axis_{current} - Mid_{stored})\left(\frac{Max_{default} - Mid_{default}}{Max_{stored} - Mid_{stored}}\right) + Mid_{default},$$

where $Axis_{current} > Mid_{stored}$ and $Mid_{defualt} = \frac{Max_{default} - Min_{default}}{2}$.

55. The method of claim 52, wherein the calibrated axis value is scaled to fit in the default range by using the linear fitting $$Axis_{calibrated} = Mid_{uncalibrated}, \text{ where}$$
$$Axis_{current} = Mid_{stored} \text{ and}$$
$$Mid_{default} = \frac{Max_{defualt} - Min_{default}}{2}.$$

56. A system for automatically calibrating the output of a control device for computer applications, comprising:

means for receiving an input axis value from the control device;

means for generating a minimum axis value and a maximum axis value from the input axis value and predetermined axis values;

means for generating a center axis value from the input axis value and the predetermined axis values if the input axis value remains substantially constant for a predetermined interval of time; and means for processing the input axis value and the minimum, maximum, and center axis values to produce a calibrated axis value.

\* \* \* \* \*

UNITED STATES PATENT AND TRADEMARK OFFICE
CERTIFICATE OF CORRECTION

PATENT NO.: 6,086,236

DATED: July 11, 2000

INVENTORS: Geurt B. De Raad and Andrei E. Pchenitchnikov

It is certified that an error appears in the above-identified patent and that said Letters Patent is hereby corrected as shown below:

Column 14, line 39, replace "$A_{old}$" with --$Axis_{old}$--.

Signed and Sealed this

Tenth Day of April, 2001

Attest:

NICHOLAS P. GODICI

Attesting Officer        Acting Director of the United States Patent and Trademark Office